(12) United States Patent
Singh et al.

(10) Patent No.: US 8,811,420 B2
(45) Date of Patent: Aug. 19, 2014

(54) SYSTEM AND METHOD FOR CONTENTION-BASED CHANNEL ACCESS FOR PEER-TO-PEER CONNECTION IN WIRELESS NETWORKS

(75) Inventors: Harkirat Singh, Santa Clara, CA (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 460 days.

(21) Appl. No.: 12/626,527

(22) Filed: Nov. 25, 2009

(65) Prior Publication Data
US 2010/0172296 A1 Jul. 8, 2010

Related U.S. Application Data

(60) Provisional application No. 61/142,590, filed on Jan. 5, 2009.

(51) Int. Cl.
*H04B 7/212* (2006.01)

(52) U.S. Cl.
USPC ............ 370/445; 370/338; 370/447; 370/461

(58) Field of Classification Search
USPC .................. 370/338, 445, 447, 461
See application file for complete search history.

(56) References Cited

U.S. PATENT DOCUMENTS

| | | | |
|---|---|---|---|
| 5,574,938 A * | 11/1996 | Bartow et al. | 709/235 |
| 6,363,062 B1 * | 3/2002 | Aaronson et al. | 370/348 |
| 6,374,085 B1 | 4/2002 | Saints et al. | |
| 6,438,723 B1 | 8/2002 | Kalliojarvi | |
| 6,611,231 B2 * | 8/2003 | Crilly, Jr. et al. | 342/378 |
| 6,640,087 B2 | 10/2003 | Reed et al. | |
| 6,662,321 B1 | 12/2003 | Collin | |
| 6,813,260 B1 * | 11/2004 | Fogle | 370/338 |

(Continued)

OTHER PUBLICATIONS

IEEE Computer Society, "802.11 IEEE Standard for Information Technology—Telecommunications and Information Exchange Between Systems—Local and Metropolitan Area Networks—Specific Requirements Part 11: Wireless LAN Medium Access Control (MAC) and Physical Layer (PHY)," IEEE, Aug. 20, 1999, pp. 1-528, United States.

(Continued)

*Primary Examiner* — Jay P Patel
(74) *Attorney, Agent, or Firm* — Kenneth L. Sherman, Esq.; Michael Zarrabian, Esq.; Sherman & Zarrabian

(57) ABSTRACT

A system and method for wireless communication is disclosed. One aspect of the system includes wireless devices, wherein the wireless devices are capable of establishing a peer-to-peer link by contention-based channel access, and wherein the wireless devices are free to contend any time for accessing a wireless channel. The system may include first and second wireless devices, each of which has a directional antenna system. The first wireless device can determine whether the wireless channel is available for establishing a peer-to-peer link, by repeating sensing whether the channel is idle in different directions each during different slot time periods. The first wireless device can also sequentially transmit multiple requests each in different directions for establishing a link with the second wireless device. The second wireless device can sequentially transmit multiple replies each in different directions for establishing the link with the first wireless device.

56 Claims, 12 Drawing Sheets

(56) References Cited

U.S. PATENT DOCUMENTS

| | | | |
|---|---|---|---|
| 6,947,409 B2 | 9/2005 | Iwamura | |
| 7,145,871 B2 | 12/2006 | Levy et al. | |
| 7,215,681 B2 | 5/2007 | Li | |
| 7,283,832 B2* | 10/2007 | Jia et al. | 455/517 |
| 7,321,580 B1* | 1/2008 | Ramanathan et al. | 370/339 |
| 7,522,552 B2* | 4/2009 | Fein et al. | 370/328 |
| 7,522,576 B2 | 4/2009 | Du et al. | |
| 7,558,249 B2* | 7/2009 | Hamamoto et al. | 370/351 |
| 7,684,343 B2 | 3/2010 | Vasil'evich et al. | |
| 7,746,943 B2 | 6/2010 | Yamaura | |
| 7,796,632 B2 | 9/2010 | Hasty et al. | |
| 7,804,842 B2* | 9/2010 | Malik et al. | 370/445 |
| 7,889,701 B2* | 2/2011 | Malik et al. | 370/334 |
| 7,945,680 B2* | 5/2011 | LoGalbo et al. | 709/227 |
| 7,965,632 B2* | 6/2011 | Sugaya | 370/231 |
| 7,990,997 B2* | 8/2011 | Wang et al. | 370/447 |
| 8,005,003 B2 | 8/2011 | Miyazaki et al. | |
| 8,098,577 B2 | 1/2012 | De Vos et al. | |
| 8,175,043 B2* | 5/2012 | So | 370/329 |
| 2002/0146023 A1 | 10/2002 | Myers | |
| 2003/0084162 A1* | 5/2003 | Johnson et al. | 709/227 |
| 2003/0125932 A1 | 7/2003 | Wang et al. | |
| 2003/0227934 A1 | 12/2003 | White et al. | |
| 2004/0111492 A1* | 6/2004 | Nakahara et al. | 709/219 |
| 2004/0258006 A1* | 12/2004 | An | 370/310 |
| 2005/0013238 A1* | 1/2005 | Hansen | 370/203 |
| 2005/0089002 A1* | 4/2005 | Shin et al. | 370/338 |
| 2005/0141545 A1* | 6/2005 | Fein et al. | 370/445 |
| 2005/0143133 A1 | 6/2005 | Bridgelall | |
| 2005/0249121 A1* | 11/2005 | Matsunaga | 370/238 |
| 2006/0030290 A1* | 2/2006 | Rudolf et al. | 455/404.1 |
| 2006/0067283 A1* | 3/2006 | So et al. | 370/338 |
| 2006/0153105 A1* | 7/2006 | Jia et al. | 370/278 |
| 2006/0159003 A1* | 7/2006 | Nanda et al. | 370/203 |
| 2006/0168343 A1* | 7/2006 | Ma et al. | 709/245 |
| 2006/0209772 A1* | 9/2006 | Fang et al. | 370/338 |
| 2006/0209822 A1* | 9/2006 | Hamamoto et al. | 370/389 |
| 2006/0209876 A1* | 9/2006 | Liu et al. | 370/445 |
| 2006/0229092 A1* | 10/2006 | Jia et al. | 455/517 |
| 2006/0274776 A1* | 12/2006 | Malik et al. | 370/445 |
| 2007/0002876 A1 | 1/2007 | Berkman et al. | |
| 2007/0099668 A1 | 5/2007 | Sadri et al. | |
| 2007/0153916 A1 | 7/2007 | Demircin et al. | |
| 2007/0204205 A1 | 8/2007 | Niu et al. | |
| 2007/0223412 A1 | 9/2007 | Lott | |
| 2007/0240191 A1 | 10/2007 | Singh et al. | |
| 2007/0268862 A1* | 11/2007 | Singh et al. | 370/329 |
| 2008/0002615 A1* | 1/2008 | Nakajima et al. | 370/328 |
| 2008/0002636 A1 | 1/2008 | Gaur et al. | |
| 2008/0112417 A1* | 5/2008 | Hamamoto et al. | 370/395.54 |
| 2008/0153502 A1* | 6/2008 | Park et al. | 455/446 |
| 2008/0186895 A1* | 8/2008 | Shang et al. | 370/312 |
| 2008/0227488 A1* | 9/2008 | Zhu et al. | 455/553.1 |
| 2008/0273600 A1 | 11/2008 | Singh et al. | |
| 2008/0298310 A1* | 12/2008 | Hu | 370/328 |
| 2008/0305791 A1* | 12/2008 | Hiben et al. | 455/435.1 |
| 2009/0022174 A1* | 1/2009 | Wang et al. | 370/462 |
| 2009/0109938 A1 | 4/2009 | Singh et al. | |
| 2009/0113059 A1* | 4/2009 | LoGalbo et al. | 709/227 |
| 2009/0161592 A1* | 6/2009 | So | 370/332 |
| 2009/0207769 A1* | 8/2009 | Park et al. | 370/311 |
| 2009/0235081 A1* | 9/2009 | Hamid et al. | 713/176 |
| 2009/0286116 A1* | 11/2009 | Matsumoto et al. | 429/17 |
| 2010/0048188 A1* | 2/2010 | Pucar Rimhagen et al. | 455/414.3 |
| 2010/0115090 A1* | 5/2010 | Petersen et al. | 709/224 |
| 2011/0009051 A1* | 1/2011 | Khedouri et al. | 455/3.06 |
| 2011/0064065 A1* | 3/2011 | Nakajima et al. | 370/338 |
| 2011/0122853 A1* | 5/2011 | Hirano et al. | 370/338 |
| 2011/0170511 A1* | 7/2011 | Chen | 370/329 |
| 2012/0020257 A1* | 1/2012 | Urabe et al. | 370/278 |
| 2012/0099576 A1* | 4/2012 | Li et al. | 370/338 |
| 2012/0263137 A1* | 10/2012 | Walton et al. | 370/329 |
| 2013/0021366 A9* | 1/2013 | Khedouri et al. | 345/619 |
| 2013/0022185 A9* | 1/2013 | Khedouri et al. | 379/102.03 |
| 2013/0142080 A1* | 6/2013 | So | 370/255 |

OTHER PUBLICATIONS

U.S. Non-final Office Action for U.S. Appl. No. 11/981,018 mailed Nov. 2, 2010.

U.S. Final Office Action for U.S. Appl. No. 11/981,018 mailed Apr. 7, 2011.

U.S. Final Office Action for U.S. Appl. No. 11/743,013 mailed Dec. 21, 2011.

U.S. Non-final Office Action for U.S. Appl. No. 11/743,013 mailed Sep. 13, 2011.

U.S. Non-Final Office Action for U.S. Appl. No. 11/743,013 mailed Nov. 2, 2012.

U.S. Final Office Action for U.S. Appl. No. 11/743,013 mailed May 13, 2013.

U.S. Non-Final Office Action for U.S. Appl. No. 11/743,013 mailed Jan. 29, 2013.

U.S. Non-Final Office Action for U.S. Appl. No. 11/981,018 mailed Oct. 18, 2013.

Choi et al., "IEEE 802.11e Contention-Based Channel Access (EDCF) Performance Evaluation," Seoul National University and Philips Research USA, May 11-15, 2003.

Courville et al, "Evaluation of centralized adhoc network architecture (CANA)," BAI cluster workshop Mar. 2004, IST BroadWay project, Jun. 1, 2004, 17 pages.

Draves et al., "Routing in multi-radio, multi-hop wireless mesh networks," 15 pages, MobiCom '04, Sep. 26-Oct. 1, 2004.

Hachman; "CE giants back Amimon's Wireless HDTV tech", pcmag.com, Jul. 23, 2008.

Heinzelman et al., "Energy efficient communication protocol for wireless microsensor networks," Proc. The 33rd Hawaii International Conference on System Science, Hawaii, U.S.A., Jan. 2000, pp. 1-10.

Hitachi et al., High Definition Multimedia Interface (HDMI) Specifications version 1.2, Aug. 22, 2005, pp. 1-214.

Iannone et al., "Can multi-rate radios reduce end-to-end delay in mesh networks? A simulation case study," Mesh Networking: Realizing the Wireless Internet (Meshnets), Jul. 2005, pp. 1-10.

IEEE 802.11, Standard for Information Technology—Telecommunications and Information Exchange between Systems—Local and Metropolitan Area Networks—Specific requirements Part 11: Wireless LAN Medium Access Control (MAC) and Physical Layer (PHY) Specifications—2007 (Revision of IEEE Std 802.11-1999), IEEE Computer Society, 1232 pages, (Jun. 12, 2007).

IEEE 802.15.3 Working Group. Part 15.3: Wireless medium access control (MAC) and physical layer (PHY) specifications for high rate wireless personal area networks (WPAN). IEEE Draft Standard, Draft P802.15.3/D16, Feb. 2003.

IEEE P802.11nTM/ D3.00, Draft Standard for information technology—Telecommunications and information exchange between systems—Local and metropolitan area networks-Specific requirements—Part Part 11: Wireless LAN Medium Access Control (MAC) and Physical Layer (PHY) specifications: Amendment 4: Enhancements for Higher Throughput, IEEE, Sep. 2007, pp. 1-544.

IST Broadway, "A 5/60GHz hybrid system concept", 12 pages; available at www.ist-browadway.org/documents/broadway-broadband_interfaces_cluster.pdf (last visited on Apr. 24, 2008).

LG Electronics et al., WirelessHD Publication of Specification Version 1.0 Overview, Oct. 9, 2007, pp. 1-77.

LG Electronics et al., WirelessHD Specifications Rev. 0.1, Jul. 12, 2006, pp. 1-175.

Madhow, "MultiGigabit millimeter wave communication: System concepts and challenges," Department of Electrical and Computer Engineering, UCSB, Workshop Jan./Feb. 2008, pp. 193-196.

Maruhashi et al., "Wireless uncompressed-HDTV-signal transmission system utilizing compact 60-GHz-band transmitter and receiver," Microwave Symposium Digest, 2005 IEEE MTT-S International, Jun. 12-17, 2005.

MBOA, Distributed Medium Access Control (MAC) for wireless networks, WiMedia Alliance, Draft 0.99, Nov. 1, 2005.

(56) References Cited

OTHER PUBLICATIONS

NEC develops compact millimeter-wave transceiver for uncompressed HDTV signal transmission, NE Asia Online, Apr. 5, 2005.

Perahia et al. "Next Generation Wireless LANs: Throughput, Robustness, and Reliability in 802.11n," Cambridge University Press, 2008, pp. 1-10.

Ramachandran et al., "Interference-aware channel assignment in multi-radio wireless mesh networks," Infocom 2006.

Ros et al., "Cluster-based OLSR extensions to reduce control overhead in mobile Ad hoc networks," International wireless Communications and Mobile Computing Conference (IWCMC 2007) Department of Information and Communications Engineering, University of Murcia, pp. 202-207, Aug. 12-16, 2007, Honolulu, Hawaii, U.S.A.

Villasenor-Gonzalez et al., "HOLSR: A hierarchical proactive routing mechanism for mobile Ad hoc networks," IEEE Communications Magazine (Jul. 2005).

U.S. Final Office Action for U.S. Appl. No. 11/981,018 mailed Feb. 21, 2014.

\* cited by examiner

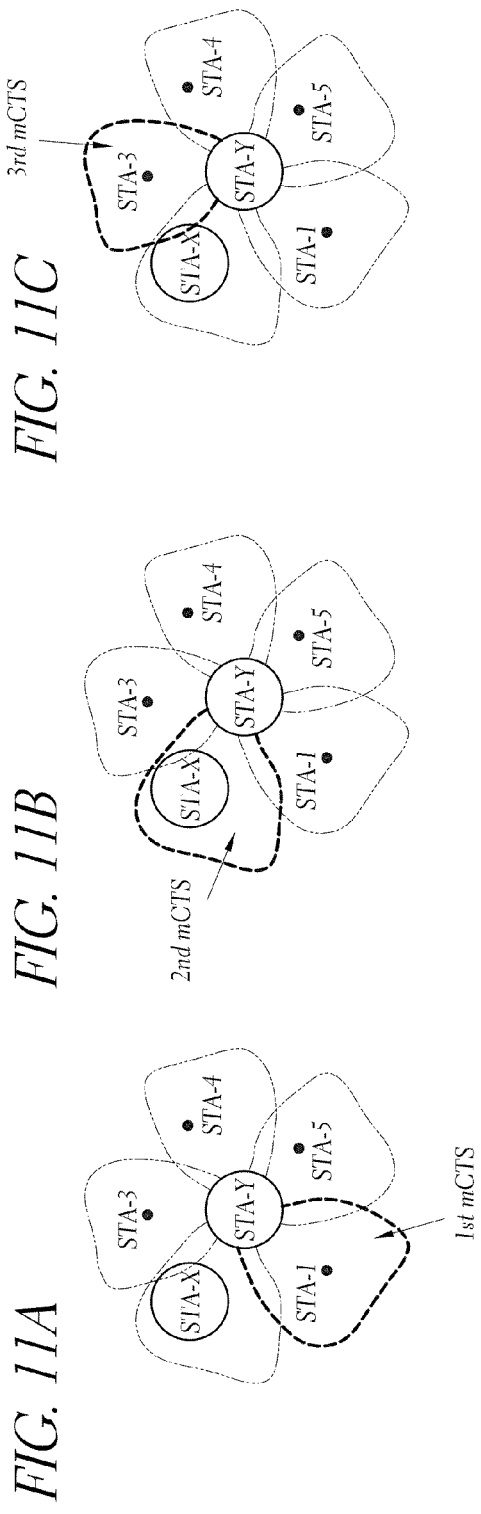

SYSTEM AND METHOD FOR CONTENTION-BASED CHANNEL ACCESS FOR PEER-TO-PEER CONNECTION IN WIRELESS NETWORKS

RELATED APPLICATION

This application claims priority from U.S. Provisional Patent Application No. 61/142,590, filed on Jan. 5, 2009, the disclosure of which is incorporated herein by reference.

BACKGROUND OF THE INVENTION

1. Field of the Invention

The present invention relates to wireless networks, and in particular, to protocols for establishing a peer-to-peer connection in a wireless network.

2. Description of the Related Technology

A wireless network typically includes a plurality of wireless devices that can wirelessly communicate with one another. In some instances, when two wireless devices in such a network desire to establish a link to communicate data or control messages, the two wireless devices can directly communicate with each other to establish such a link. Various protocols for establishing such a link have been developed. For example, IEEE 802.11 provides some protocols for wireless devices having omni-directional transmission/reception capability (hereinafter, referred to as "omni-directional wireless devices"). With such wireless devices, a signal sent by a wireless device can be received by another intended wireless device, regardless of their relative positions, as long as the intended device is within the range of the signal.

Recently, certain wireless devices have been developed for communication on a channel of a relatively high frequency, for example, a frequency greater than 6 GHz. Such wireless devices typically have a directional antenna system that can cover only a selected direction for transmission/reception (hereinafter, referred to as "directional wireless devices").

In most cases, when establishing a link between two of such directional wireless devices, the devices may not have information on the relative positions of the devices. Thus, a signal sent by one of the devices may not be received by the other device if the other wireless device is not positioned in a direction which the signal is transmitted. Thus, protocols designed for omni-directional wireless devices may not be effectively used for such directional wireless devices. Therefore, there is a need for providing a protocol for establishing a link between directional wireless devices.

SUMMARY OF CERTAIN INVENTIVE ASPECTS

One inventive aspect is a method of communication in a wireless network comprising non-access point wireless devices, wherein the wireless devices are capable of establishing a peer-to-peer link by contention-based channel access, and wherein the wireless devices are free to contend any time for accessing a wireless channel. The method comprises: determining, by a non-access point wireless device having a directional antenna system in the wireless network, whether a wireless channel is available for establishing a peer-to-peer link by: sensing whether the channel is idle in a first direction during a first slot time period by orienting the directional antenna system toward the first direction, and sensing whether the channel is idle in a second direction different from the first direction during a second slot time period by orienting the directional antenna system toward the second direction.

Another inventive aspect is a method of communication in a wireless network comprising non-access point wireless devices, wherein the wireless devices are capable of establishing a peer-to-peer link by contention-based channel access, wherein the wireless devices are free to contend any time for accessing a wireless channel. The method comprises: receiving, by a non-access point wireless device in the wireless network, a request addressed to the wireless device for establishing a link with another non-access point wireless device in the wireless network. The wireless device comprises a directional antenna system including an array of antenna elements. The method also comprises transmitting, by the wireless device, multiple replies for establishing the link, the replies being addressed to the other wireless device, by: transmitting a first reply in a first reply transmission direction by orienting the directional antenna system toward the first reply transmission direction, and transmitting a second reply in a second reply transmission direction by orienting the directional antenna system toward the second reply transmission direction.

Yet another inventive aspect is a method of communication in a wireless network comprising non-access point wireless devices, wherein the wireless devices are capable of establishing a peer-to-peer link by contention-based channel access, wherein the wireless devices are free to contend any time for accessing a wireless channel. The method comprises: determining, by a first non-access point wireless device having a directional antenna system in the wireless network, whether a wireless channel is available for establishing a peer-to-peer link, wherein determining whether the wireless channel is available comprises repeatedly sensing whether the channel is idle in each of different directions during a respective one of different slot time periods. The method also comprises sequentially transmitting, by the first wireless device, multiple requests each in respective different directions for establishing a link with a second non-access point wireless device in the wireless network, the requests being addressed to the second wireless device. The method further comprises sequentially transmitting, by the second wireless device, multiple replies each in respective different directions for establishing the link with the first wireless device, the replies being addressed to the first wireless device.

Yet another inventive aspect is a non-access point wireless device for wireless communication in a wireless network including a plurality of non-access point wireless devices. The device comprises: a directional antenna system; and a medium access control (MAC) layer configured to establish a peer-to-peer link by contention-based channel access, wherein the wireless device is free to contend any time for accessing a wireless channel. The MAC layer is further configured to determine whether the wireless channel is available for establishing a peer-to-peer link, using the directional antenna system, by: sensing whether the channel is idle in a first direction during a first slot time period by orienting the directional antenna system toward the first direction, and sensing whether the channel is idle in a second direction different from the first direction during a second slot time period by orienting the directional antenna system toward the second direction.

Yet another inventive aspect is a non-access point wireless device for wireless communication in a wireless network including a plurality of non-access point wireless devices. The device comprises: a directional antenna system including an array of antenna elements; and a medium access control (MAC) layer configured to establish a peer-to-peer link by contention-based channel access, wherein the wireless device is free to contend any time for accessing a wireless channel.

The MAC layer is further configured to receive a request addressed to the wireless device for establishing a link with another non-access point wireless device, by using less than all of the antenna elements. The MAC layer is further configured to transmit multiple replies for establishing the link, the replies being addressed to the other wireless device, by: transmitting a first reply in a first reply transmission direction by orienting the directional antenna system toward the first reply transmission direction, and transmitting a second reply in a second reply transmission direction by orienting the directional antenna system toward the second reply transmission direction.

Yet another inventive aspect is a wireless system comprising non-access point wireless devices, wherein the wireless devices are capable of establishing a peer-to-peer link by contention-based channel access, wherein the wireless devices are free to contend any time for accessing a wireless channel. The system comprises: a first non-access point wireless device in the wireless network, the first wireless device having a directional antenna system; and a second non-access point wireless device in the wireless network, the second wireless device having a directional antenna system. The first wireless device is configured to determine whether a wireless channel is available for establishing a peer-to-peer link, by repeatedly sensing whether the channel is idle in each of different directions during a respective one of different slot time periods. The first wireless device is further configured to sequentially transmit multiple requests each in respective different directions for establishing a link with the second wireless device, the requests being addressed to the second wireless device. The second wireless device is configured to sequentially transmit multiple replies each in respective different directions for establishing the link, the replies being addressed to the first wireless device.

BRIEF DESCRIPTION OF THE DRAWINGS

FIGS. 11A-11E are diagrams illustrating transmitting multiple clear-to-send (mCTS) messages in the method of FIG. 10 according to one embodiment.

DETAILED DESCRIPTION OF CERTAIN INVENTIVE EMBODIMENTS

Figure 1:
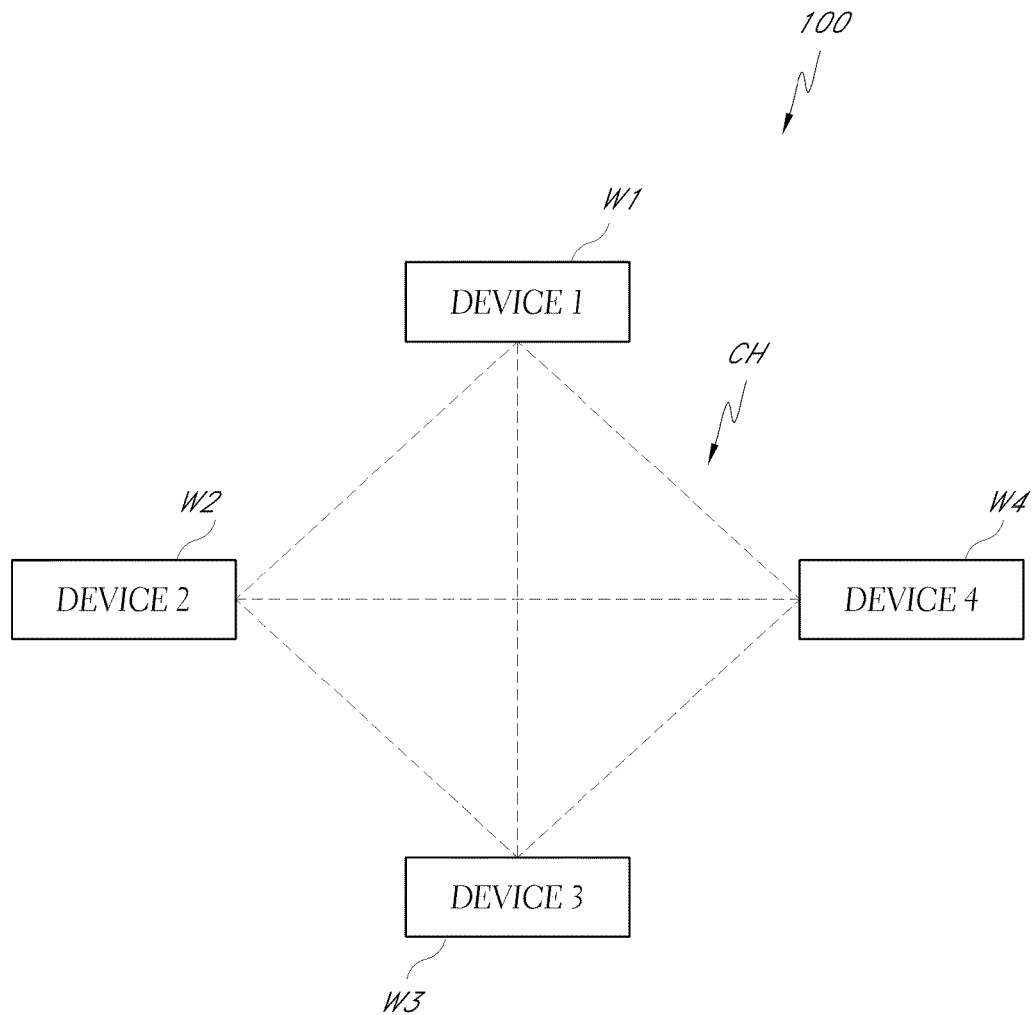
FIG. 1 is a block diagram of a conventional ad-hoc wireless network.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

The terminology used in the description presented herein is not intended to be interpreted in any limited or restrictive manner, simply because it is being utilized in conjunction with a detailed description of certain specific embodiments of the invention. Furthermore, embodiments of the invention may include multiple novel features, no single one of which is essential.

Overview of Wireless Systems

Referring to FIG. 1, a conventional ad-hoc wireless network will be described below. The illustrated network 100 includes first to fourth wireless devices W1-W4, but includes no coordinator, such as an access point station. Wireless devices that are not a coordinator can be referred to as a "non-access point station" or "non-access point wireless device" in the context of this document. It will be appreciated that the network can include more wireless devices than those shown in FIG. 1.

The first to fourth wireless device W1-W4 can communicate with one another via one or more wireless channels (or wireless medium) CH. In some arrangements, one of the wireless devices W1-W4 can schedule a transmission time with another of the wireless devices, and conduct wireless transmission with the other wireless device during the scheduled transmission time.

The wireless devices W1-W4 can be electronic devices that have wireless capability. Examples of such electronic devices include, but are not limited to, a mobile phone, a telephone, a television, a set-top box, a computer monitor, a computer, a hand-held computer, a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, a game machine, etc.

The wireless devices W1-W4 can communicate with one another via a peer-to-peer link. In such an instance, one of the wireless devices (hereinafter, referred to as a "source device") sends signals directly to another wireless device (hereinafter, referred to as a "destination device") without using a third wireless device.

Figure 2:
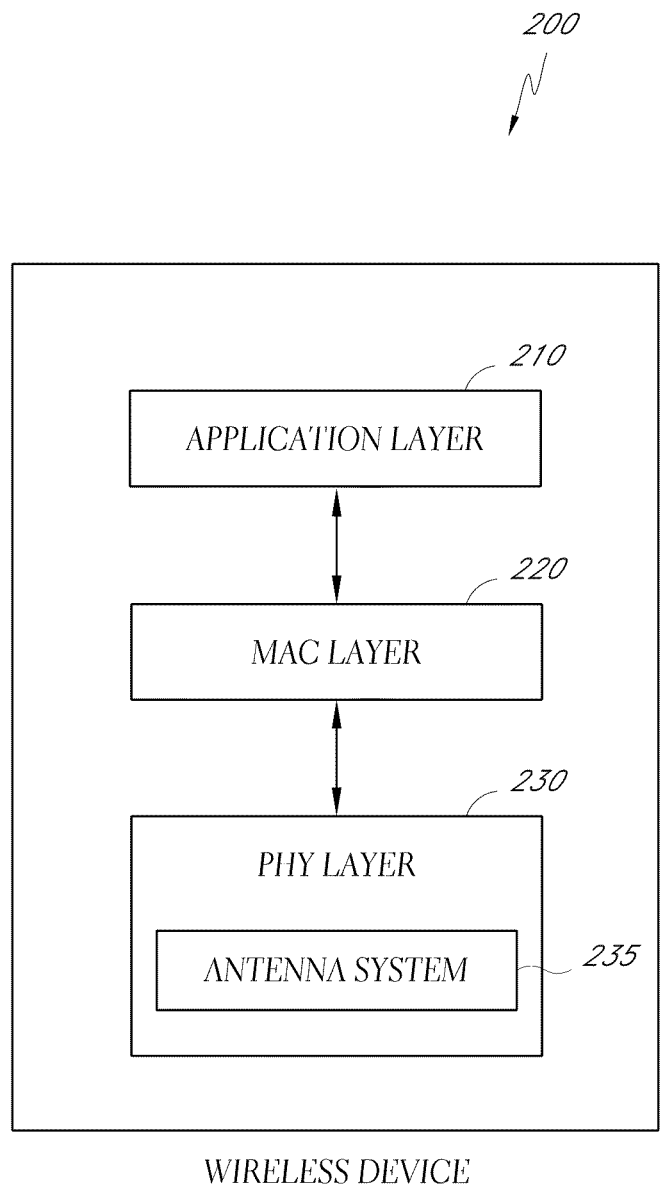
FIG. 2 is a block diagram of a conventional wireless device.

Referring to FIG. 2, an example configuration of a conventional wireless device for use in a wireless network will be described below. The wireless devices of FIG. 1 may have the same configuration as that of the wireless device of FIG. 2. The illustrated wireless device 200 includes an application layer 210, a medium access control (MAC) layer 220, and a physical (PHY) layer 230.

The application layer 210 may include a data pre-processing module and a data control module. The data pre-processing module can perform pre-processing of data, such as partitioning of data. The data control module provides a standard way to exchange data handling information such as capability information. For example, before a connection begins, the data control module negotiates data formats to be used, and when the need for the connection is completed, data control commands are used to stop the connection.

The MAC layer 220 controls how the wireless device 200 gains access to data and permission to transmit it over the network. MAC layer 220 also serves to process data from the application layer 210 to form packets suitable for wireless transmission.

The PHY layer 230 serves to further process the data packets from the MAC layer 220, and send them over wireless channels. The PHY layer 230 can add PHY headers to the data packets, and sends the packets via an antenna system 235 thereof.

The antenna system 235 may be capable of directional and/or omni-directional transmission and reception. In certain arrangements, the antenna system 235 may be directional, and can be a sector antenna system.

Figure 3A:
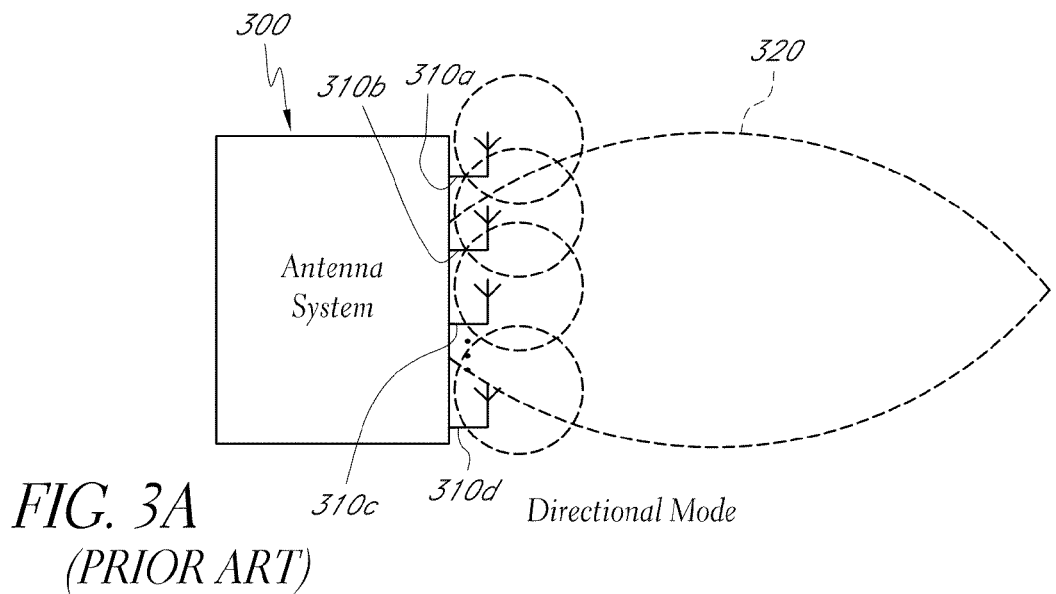
FIG. 3A is a block diagram illustrating a conventional antenna system in directional mode.
Figure 3B:
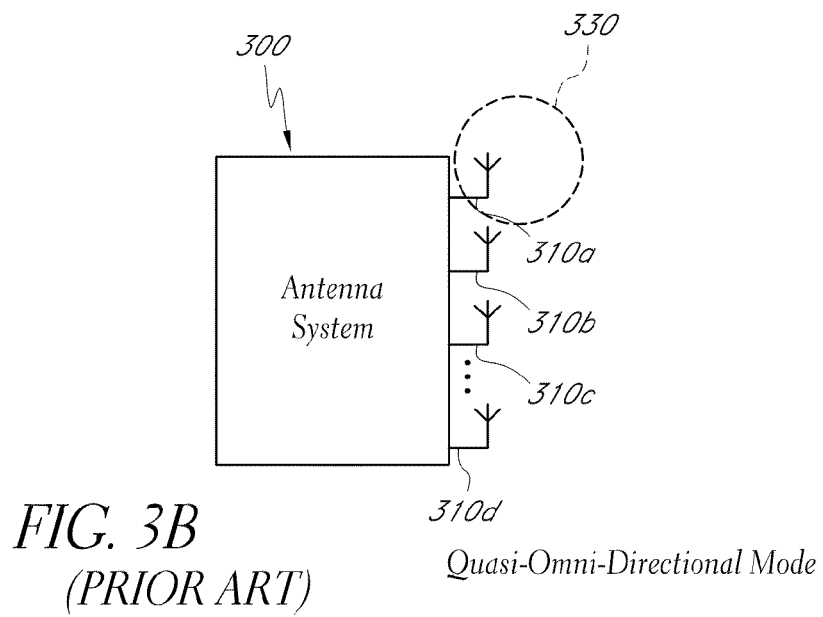
FIG. 3B illustrates the antenna system of FIG. 3A in quasi-omni directional mode.

Referring to FIGS. 3A and 3B, one example of directional antenna system will be described below. The illustrated antenna system 300 includes an array of antenna elements, including first to fourth antenna elements 310a-310d. When the antenna system 300 is in a directional mode (FIG. 3A) for transmission (hereinafter, "directional transmission"), each of the antenna elements 310a-310d individually generates a transmission signal with a selected phase and amplitude. The signals generated by the antenna elements 310a-310d interfere with one another, and together form a directional beam 320 in a selected direction. The phases and amplitudes of the signals from the antenna elements 310a-310d can be controlled by a beamformer to direct the beam 320 in the selected direction. When the antenna system 300 is in a directional mode (FIG. 3A) for reception (hereinafter, "directional reception"), signals received by the antenna elements 310a-310d are combined in such a way that the expected pattern of signal reception is observed.

The directional antenna system 300 can cover substantially all directions by changing the direction of the directional beam 320 until all the directions are covered. The directional beam 320 can have substantially the same angular range or coverage (or beamwidth) in each of the directions. In such an embodiment, the angular range of the directional beam in each direction can be about 360°/k. In other embodiments, the directional beam 320 can have different angular ranges in two or more of the directions. For example, the directional antenna system can cover about 90° in a first direction, about 60° in a second direction, about 80° in a third direction, about 120° in a fourth direction, about 10° in a fifth direction to cover all directions.

When the antenna system 300 is in a quasi-omni directional mode (FIG. 3B) for transmission (hereinafter, "quasi-omni directional transmission"), a selected one of the antenna elements 310a-310d generates a transmission signal 330 with a selected phase and amplitude. Such an antenna element can be selected, based on the direction in which the antenna system 300 needs to be oriented. The transmission signal 330 can have a range (transmission distance) shorter than that of the directional beam 320 (FIG. 3A). However, the transmission signal 330 can have an angular range greater than that of the directional beam 320. In one embodiment, the angular range can be up to about 120°, for example, between about 10° and about 120°. When the antenna system 300 is in a quasi-omni directional mode for reception (hereinafter, "quasi-omni directional reception"), a signal from a selected antenna element 310a-310d is provided for processing.

Figure 4B:
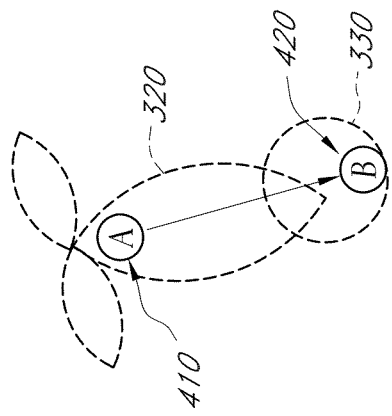
FIG. 4B is a diagram illustrating the two wireless devices, in which one of the devices is in directional mode, and the other is in quasi-omni directional mode.
Figure 4A:
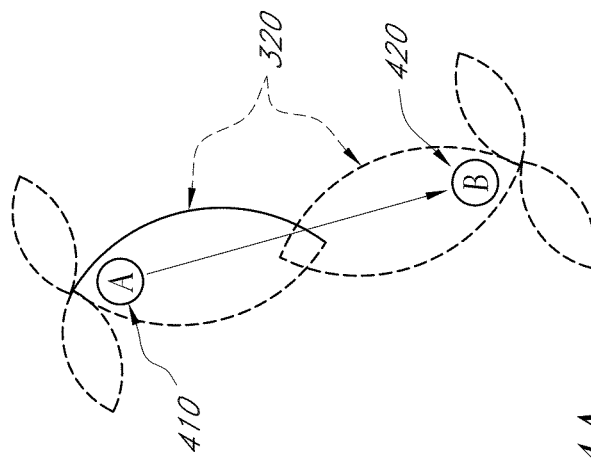
FIG. 4A is a diagram illustrating two wireless devices, both of which are in directional mode.

Referring to FIG. 4A, one example of directional transmission between wireless devices will be described below. In the illustrated example, a first wireless device 410 and a second wireless device 420 perform a direction transmission from the first wireless device 410 to the second wireless device 420. The first wireless device 410 is in a directional mode for transmission, and the second wireless device 420 is in a directional mode for reception. Each of the wireless devices 410, 420 forms a directional beam 320 in a selected direction for the directional transmission between the wireless devices 410, 420.

Referring to FIG. 4B, another example of directional transmission between wireless devices will be described below. In the illustrated example, a first wireless device 410 and a second wireless device 420 perform a direction transmission from the first wireless device 410 to the second wireless device 420. The first wireless device 410 is in a directional mode for transmission, and the second wireless device 420 is in a quasi-omni directional mode for reception. The first wireless device 410 forms a directional beam 320 in a selected direction toward the second wireless device 420. However, the second wireless device 420 performs quasi-omni directional reception toward the first wireless device 410. In this example, the second wireless device 420 needs to be closer to the first wireless device 410 than in the example of FIG. 4A because the quasi-omni directional reception has a shorter range than the directional reception.

Peer-to-Peer Connection Between Directional Wireless Devices

Certain wireless protocols provide schemes for contention-based channel access to establish a peer-to-peer link for data and/or control message transmission. Under such a contention-based channel access protocol, wireless devices are free to contend any time for accessing a channel. The peer-to-peer link can be established directly between two non-access point wireless devices, without using a third device, such as an access point. For example, IEEE 802.11 provides various schemes for establishing such a peer-to-peer link. The IEEE 802.11 standard, including IEEE 802.11a, b, g, and n, is incorporated herein by reference in its entirety.

In some protocols using contention-based channel access, a source station detects (or performs a carrier sensing of) a wireless channel (or wireless medium) to determine whether the channel is available for a peer-to-peer link with a destination station. If the channel is available for a peer-to-peer link, the source station can attempt to communicate directly with the destination station to determine if the destination station is available for data and/or control message transmission. If the destination station is available for the transmission, the source station can transmit data and/or control messages to the destination station.

For example, in a protocol under IEEE 802.11, a source station detects a wireless channel if the wireless channel is idle for a selected duration. If the channel is idle, the source station sends a request-to-send (RTS) message to a destination station. If the destination station is available for establishing a peer-to-peer link with the source station, the destination station sends the source station a clear-to-send (CTS) message. Under IEEE 802.11, the stations perform omni-directional transmission on, for example, a 2.4 or 5 GHz channel. Because of the omni-directionality of the transmission, relative positions of the source and destination stations do not affect contention-based channel access.

In some instances, a wireless system can include wireless devices that perform directional transmission/reception. In such instances, two of such wireless devices can establish a peer-to-peer link by contention-based channel access. However, because of the directionality of the transmission between the devices, a peer-to-peer link may not be effectively established, if a protocol for omni-directional wireless devices is used without modification. Therefore, providing a scheme for establishing a peer-to-peer link by contention-based channel access between wireless devices having directional transmission/reception capability is desired.

In one embodiment, a peer-to-peer link between non-access point wireless devices in a wireless network having contention-based channel access is established. The link can be used for data and/or control message transmission. The wireless devices can have directional transmission/reception capability. In some embodiments, the wireless devices can also have quasi-omni directional transmission/reception capability.

One of the wireless devices can be a source station that transmits data and/or control messages to another of the wireless devices, i.e., a destination station, via a peer-to-peer link. In order to establish such a peer-to-peer link, the source station can sense a wireless channel in substantially all directions during a selected duration to determine whether the channel is idle.

In sensing the wireless channel, the source station can be in a directional mode. The source station can orient its directional antenna system towards a first direction covering a first angular range during a first slot time period. Then, the source station can change the direction of the antenna system to detect the channel in a second direction covering a second angular range during a second slot time period. The source station can repeat this step for different directions during each of additional slot time periods (for example, third to k-th slot time periods) until it covers substantially all directions.

The entire duration of the first to k-th slot time periods can be equal to or less than the selected duration. The number of slot time periods can be selected, based on the angular range that can be covered by the directional antenna system. In one embodiment where the directional antenna system has an angular range (or antenna beamwidth) of about 360°/k for each of different directions, the number of slot time periods can be k to cover all directions. For example, if the angular range of the directional antenna system is about 90°, the number of slot time periods can be 360°/90°, that is 4. In another embodiment where the directional antenna system has two or more different angular ranges for k-number of different directions, the number of the slot time can also be k to cover all directions. Thus, the selected duration can include first to fourth slot time periods to cover all the directions. In this manner, the source station can ensure that the channel is available for a peer-to-peer link.

In some embodiments, when the source station determines if the destination station is available for data and/or control message transmission, the source station can also use a scheme similar to the one described above in connection with sensing wireless channel availability. For example, the source station can sequentially transmit multiple requests for the destination station in different directions, using its directional antenna system to cover substantially all directions. In addition, the destination station can also sequentially transmit multiple replies for the source station in different directions, using its directional antenna system to cover substantially all directions. In this manner, the source and destination stations can emulate omni-directional transmission using their directional antenna systems.

In this document, embodiments will be described as modifications to protocols under IEEE 802.11. However, a skilled technologist will appreciate that the embodiments can be adapted for any suitable contention-based channel access protocols for establishing a peer-to-peer link.

Figure 5:
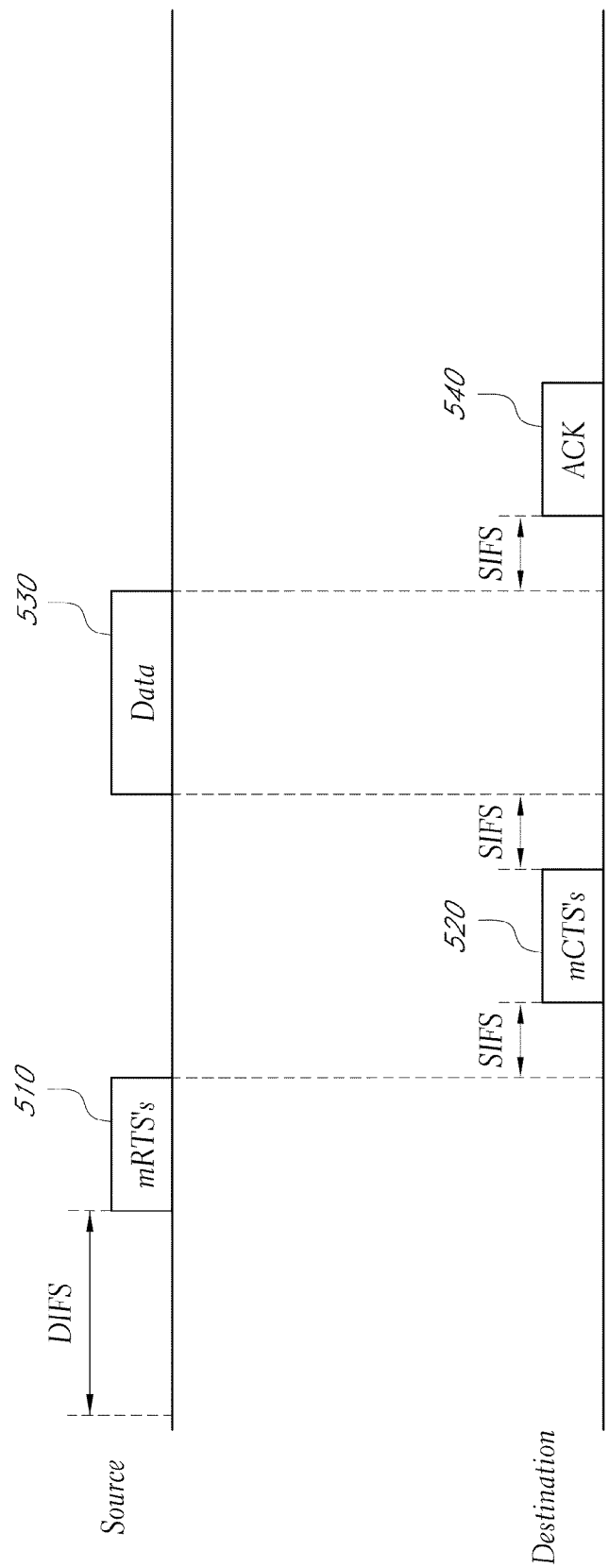
FIG. 5 is a timing diagram illustrating a method of peer-to-peer wireless communication between two wireless devices according to one embodiment.

Referring to FIG. 5, a method of establishing a peer-to-peer connection between wireless devices by contention-based channel access according to one embodiment will be described below. FIG. 5 is a timing diagram showing message exchange between a source station and a destination station. Both of the source and destination stations are capable of directional transmission/reception, and optionally quasi-omni directional transmission/reception. The source and destination stations can use a channel frequency that is equal to or higher than about 6 GHz, for example, about 60 GHz. In other embodiments, the source and destination stations can use a channel frequency in a Terahertz range.

In the illustrated embodiment, the source and destination stations can use a basic medium access protocol similar to Distributed Coordination Function (DCF) defined by IEEE 802.11. The DCF allows for automatic medium sharing between compatible physical layers (PHYs) of wireless devices through the use of Carrier Sense Multiple Access with Collision Avoidance (CSMA/CA) protocol and a random backoff time following a busy medium condition. The CSMA/CA protocol is designed to reduce the collision probability between multiple wireless devices accessing a wireless medium (or wireless channel), at a point where collisions would most likely occur. Other details of the DCF are disclosed in IEEE 802.11. Although the embodiments herein are described with reference to the DCF under IEEE 802.11, a skilled technologist will appreciate that the embodiments described herein can also be adapted for use with protocols of other wireless standards.

Referring back to FIG. 5, a source station, which attempts to wirelessly transmit a packet (for example, a data packet), senses a wireless channel for a duration called DCF Interface Space (DIFS). During the DIFS, the source station determines if the channel is idle, and waits until the end of the DIFS to make sure that the wireless channel is idle. If the channel is busy, the source station defers for a random period, and senses the channel again after the deferred period is over.

If the wireless channel is idle until the end of the DIFS, the source station transmits multiple request-to-send (mRTS) messages 510 addressed to the destination station. Upon receiving one or more of the mRTS messages 510, the destination station waits for a duration called "Short Interframe Space" (SIFS). If the destination station is available for a peer-to-peer connection with the source station, the destination station can transmit multiple clear-to-send (mCTS) messages 520 addressed to the source station. Upon receiving one or more of the mCTS messages 520, the source station waits for SIFS, and then transmits one or more data packets 530 to the destination station. After the transmission of the data packets 530 is terminated, the destination station waits for SIFS, and then transmits an acknowledgment (ACK) 540 to the source station.

Figure 6:
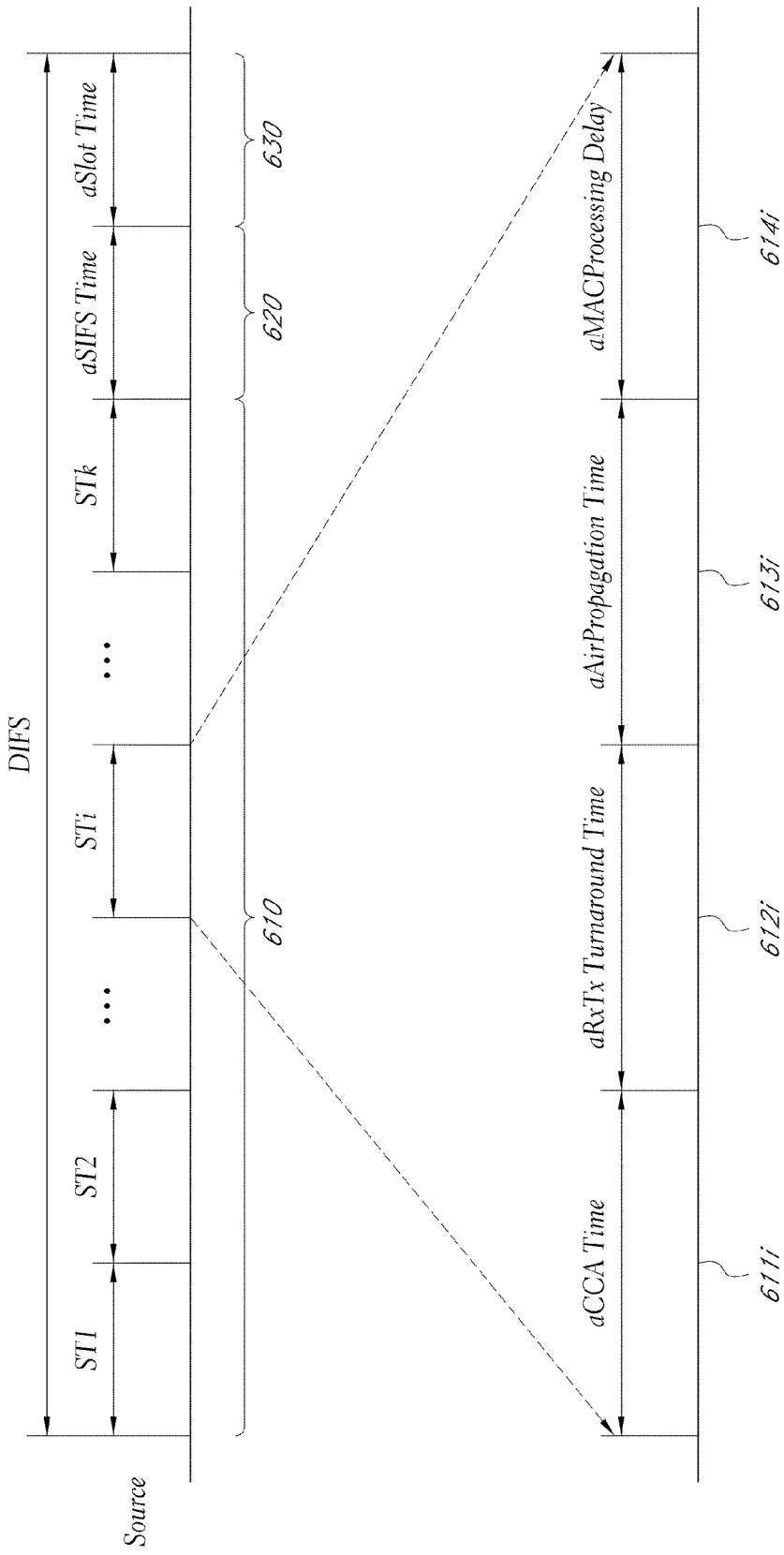
FIG. 6 is a timing diagram illustrating Distributed Coordination Function (DCF) Interframe Space (DIFS) used in the method of FIG. 5 according to one embodiment.

Referring to FIG. 6, details of the DIFS of FIG. 5 will be described below. The illustrated DIFS includes a plurality of slot time periods 610, a short interframe space (SIFS) period 620, and an additional slot time period 630 in sequence.

The plurality of slot time periods 610 can include first to k-th slot time periods ST1-STk. Each of the first to k-th slot time periods ST1-STk can include a plurality of sub-periods. The slot time periods ST1-STk can have the same duration and sub-periods as one another. Each of the slot time periods ST1-STk can provide the minimum time necessary to sense the channel in a selected direction for determining if the channel in the direction is busy or idle. In some embodiments, the configuration of each of the slot time periods ST1-STk can be the same as or similar to aSlotTime specified by the IEEE 802.11 standard.

In one embodiment, an i-th slot time period STi can have first to fourth sub-periods 611$i$, 612$i$, 613$i$, and 614$i$, as shown in FIG. 6. The other slot time periods ST1 to STi−1, and STi+1 to STk can have the same configuration as the i-th slot time period STi.

The first sub-period 611$i$ is a minimum time period during which the clear channel assessment (CCA) mechanism of a wireless device (for example, the source station) can access the wireless channel in a selected direction to determine whether the channel in the selected direction is busy or idle. In one embodiment, the first sub-period 611$i$ can be the same as or similar to aCCATime specified by the IEEE 802.11 standard in terms of duration. A skilled technologist will, however, appreciate that the first sub-period 611$i$ can have a duration that varies depending on the system implementation.

The second sub-period 612$i$ is a maximum time period that the PHY layer of the wireless device takes for switching from receiving a symbol of a frame on the channel to transmitting a first symbol of the preamble of a next frame on the channel. In one embodiment, the second sub-period 612$i$ is the same as or similar to aRxTxTurnaroundTime specified by the IEEE 802.11 standard. A skilled technologist will, however, appreciate that the second sub-period 612$i$ can have a duration that varies depending on the system implementation.

The third sub-period 613$i$ is an anticipated time period that it takes for a signal from the wireless device to travel from the wireless device to a receiving wireless device. In one embodiment, the third sub-period 613$i$ is the same as or similar to aAirPropagationTime specified by the IEEE 802.11 standard. A skilled technologist will, however, appreciate that the third sub-period 613$i$ can have a duration that varies depending on the system implementation.

The fourth sub-period 614$i$ is a nominal time period that the MAC layer of the wireless device uses to process a frame and prepare a response to the frame. In one embodiment, the fourth sub-period 614$i$ is the same as or similar to aMACProcessingDelay specified by the IEEE 802.11 standard. A skilled technologist will, however, appreciate that the fourth sub-period 614$i$ can have a duration that varies depending on the system implementation.

Thus, the i-th slot time period STi can be represented by Equation 1 below.

$$i\text{-}th\ \text{aSlotTime}=\text{aCCATime}+\text{aRxTxTurnaroundTime}+\text{aAirPropagationTime}+\text{aMACProcessingDelay} \quad \text{Equation 1}$$

The SIFS period 620 is used to separate transmissions belonging to a single dialog (for example, a data frame and an ACK that acknowledges the receipt of the data frame). The SIFS period 620 can last for SIFS that is the minimum interframe space. There can always be at most one single wireless device to transmit at this given time, thus having the highest priority over all other wireless devices. The value of the minimum interframe space can be fixed per the PHY layer of the wireless device. The SIFS period 620 can include a delay for the wireless station to switch back to the receive mode and prepare for decoding an incoming packet.

In one embodiment, the SIFS period 620 can have the same configuration as aSIFSTime specified by the IEEE 802.11 standard. For example, the SIFS period 620 can be represented by Equation 2 below.

$$\text{aSIFSTime}=\text{aRxRFDelay}+\text{aRxPLCPDelay}+\text{aMACProcessingDelay}+\text{aRxTxTurnaroundTime} \quad \text{Equation 2}$$

In Equation 2, aRxRFDelay is the nominal time (in microseconds) between the end of a symbol at the air interface and the issuance of a physical medium dependent (PMD)-DATA indication to the physical layer convergence procedure (PLCP). aRxPLCPDelay is the nominal time (in microseconds) that the PLCP uses to deliver a bit from the PMD receive path to the MAC. The MACProcessingDelay and the aRxTxTurnaroundTime can be as described earlier with respect to those of the i-th slot time period STi. Detailed definitions of these symbols are provided by IEEE 802.11 specifications, all versions of which are incorporated herein by reference.

The additional slot time period 630 can have the same configuration as that of one of the first to k-th slot time periods ST1-STk. Thus, the additional slot time period 630 can be represented by Equation 3 below. Details of the symbols in Equation 3 can be as described above with respect to the i-th slot time period STi.

$$\text{Additional aSlotTime}=\text{aCCATime}+\text{aRxTxTurnaroundTime}+\text{aAirPropagationTime}+\text{aMACProcessingDelay} \quad \text{Equation 3}$$

In the illustrated embodiment, the wireless devices perform directional transmissions at a frequency of, for example, 60 GHz. The first sub-period 611$i$, which is similar to aCCATime under IEEE 802.11 in terms of duration, is re-defined to be the minimum time for a wireless device to sense the channel in a selected direction. Assuming that the wireless device needs to repeat k times (each in different direction) to emulate omni-directional transmission, the DIFS time can be represented by Equation 4 below. In Equation 4, k*aSlotTime can be referred to as one "aSlotTime60 GHz" that allows clear channel assessment (CCA) in multiple directions.

$$\text{aDIFSTime}=k*\text{aSlotTime}+\text{aSIFSTime}+\text{aSlotTime} \quad \text{Equation 4}$$

Figure 7:
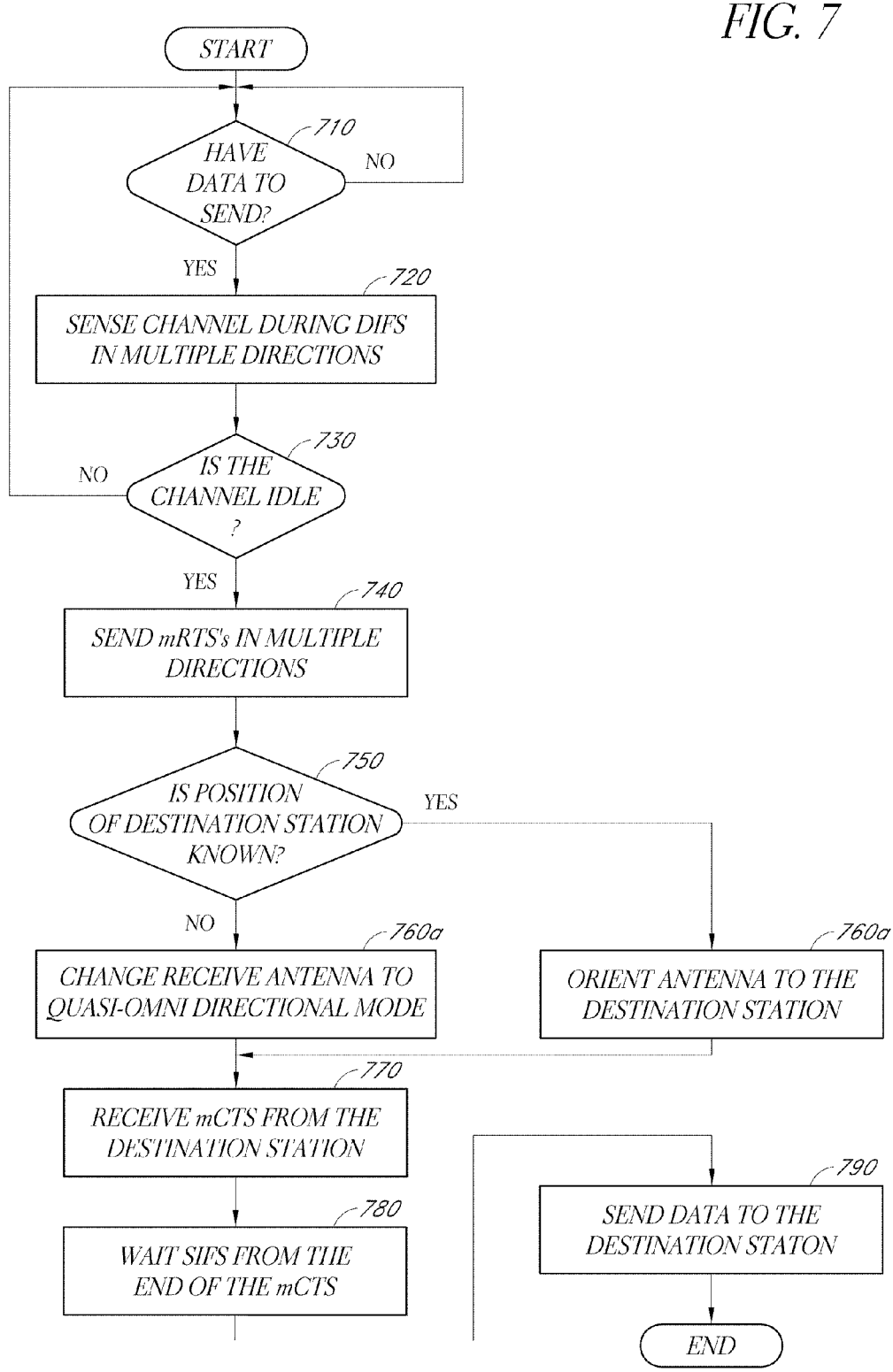
FIG. 7 is a flowchart illustrating a method of peer-to-peer wireless communication, performed by a source station according to one embodiment.

Referring to FIG. 7, a method of communicating via a peer-to-peer connection between directional wireless devices according to one embodiment will be described below. The illustrated method can be performed by a source station.

At block 710, the source station determines if it has data to be sent to a destination station. If "NO" at block 710, it waits for a selected time period, and determines again if it has data to be sent to a destination station.

If "YES" at block 710, the method goes to block 720, at which the source station senses a channel during a DIFS period. The details of the DIFS period can be as described earlier in connection with FIGS. 5 and 6.

Figure 8:
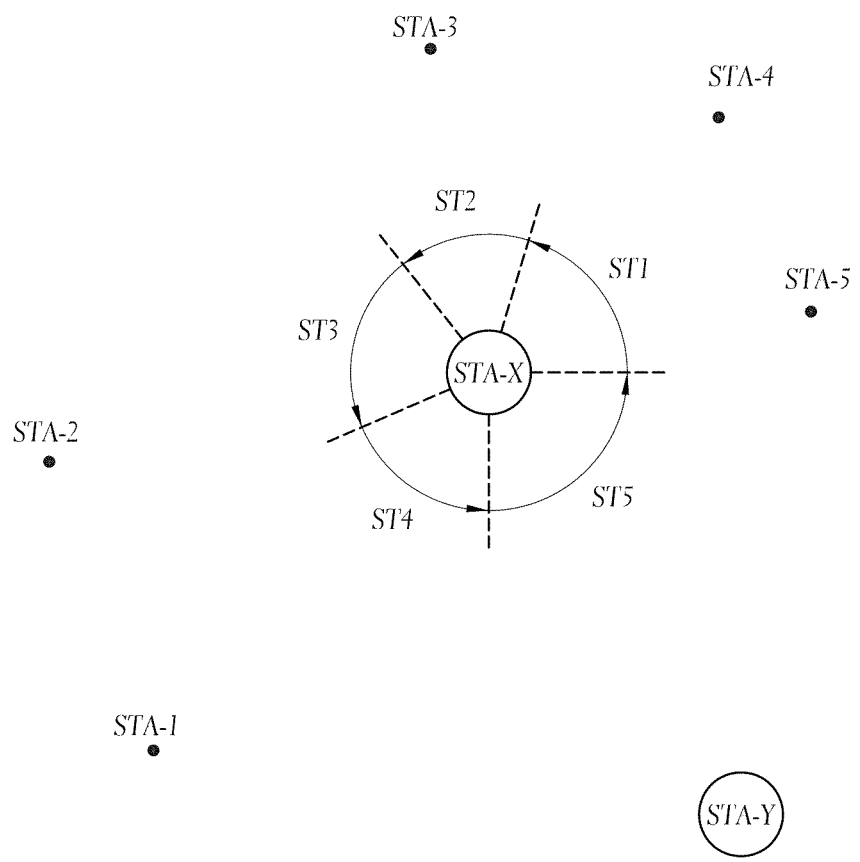
FIG. 8 is a diagram illustrating sensing a wireless channel during DIFS in the method of FIG. 7 according to one embodiment.

Referring now to FIG. 8 which illustrates a wireless network including a plurality of wireless devices STA-1 to STA-5, STA-X, STA-Y, the source station STA-X senses the channel during the DIFS period. The source station STA-X, while it performs sensing of the channel in a selected direction at a time, repeats the sensing to cover multiple directions, thereby emulating omni-directional sensing of the channel. In the illustrated embodiment, the source station STA-X can cover an angular range of about 360°/5 or 72° during one of the slot time periods. In the illustrated embodiments, the angular ranges of adjacent sensing directions from each other are without a gap or an overlap therebetween. In other embodiments, however, there can be an overlap or gap between angular ranges of adjacent directions.

Thus, in the illustrated embodiment, the slot time periods 610 of the DIFS period (FIG. 6) can include first to fifth slot time periods ST1-ST5. During each of the slot time periods ST1-ST5, the source station STA-X can perform sensing of the channel in a respective one of the directions, thus covering substantially all directions during the entire one "aSlot- Time60 GHz." A skilled technologist will appreciate that the angular range of the source station can vary widely, depending on the configuration of the source station, and thus the number of slot time periods in the slot time periods 610 can also vary, depending on the angular range of the source station.

Referring back to FIG. 7, at block 730, the source station determines whether the channel is idle. If "YES" at block 730, the method proceeds to block 740. If "NO" at block 730, the method goes back to block 710.

In some embodiments, if the channel is idle, the source station generates a random backoff period as in IEEE 802.11 for an additional deferral time before transmitting mRTS messages. Details of the random backoff can be as described in IEEE 802.11. Additional deferral time is in terms of number of slots, wherein one slot is large enough to perform Clear Channel Assessment (CCA) in one direction. In another embodiment, the backoff could be in terms of aSlotTime60 GHz. If the channel is busy, the source station cancels the backoff and starts another round of contention as in 802.11.

At block 740, the source station can send multiple request-to-send (mRTS) messages in multiple directions, as shown in the timing diagram of FIG. 5. Details of the frame format of the mRTS messages will be described later with reference to FIG. 12A.

Figure 9C:
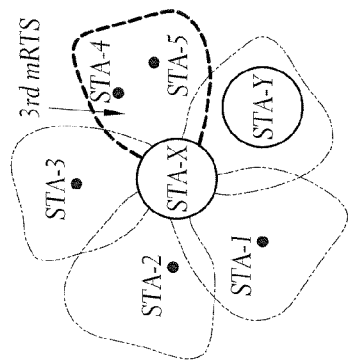
FIGS. 9A-9E are diagrams illustrating transmitting multiple request-to-send (mRTS) messages in the method of FIG. 7 according to one embodiment.
Figure 9B:
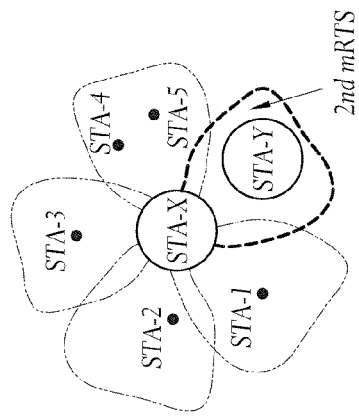
Figure 9E:
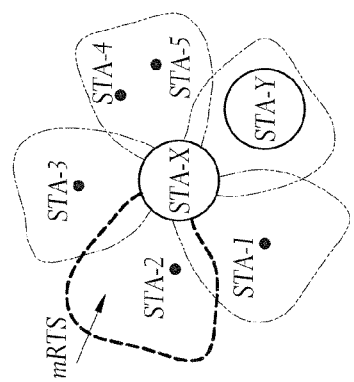
Figure 9A:
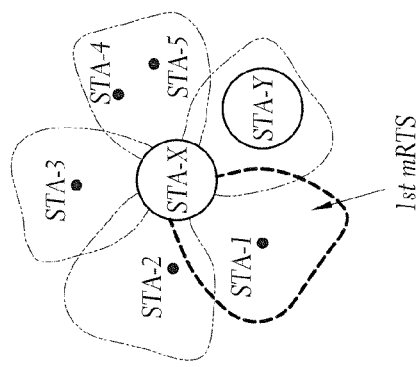

Referring now to FIG. 9A-9E, one example of a process occurring at block 740 will be described below. In FIG. 9A, the source station STA-X transmits a first mRTS message in a first direction which covers a first angular range of about 360°/k, where k is the number of directions in which mRTS messages are transmitted. In the illustrated embodiment, the mRTS messages are transmitted in five directions, and thus, the first angular range is about 360°/5, or about 72°. In FIG. 9B, the source station STA-X transmits a second mRTS message in a second direction which covers a second angular range of about 72°, which is the same as the first angular range. Because the destination station STA-Y is within the second angular range, the destination station STA-Y can receive the second mRTS.

Figure 9D:
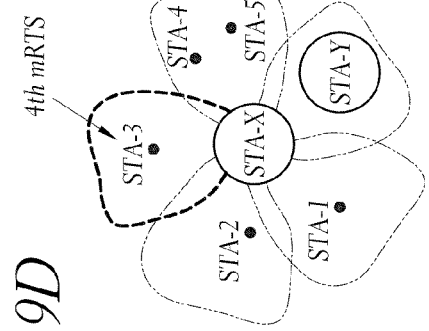

Next, the source station STA-X transmits a third mRTS message in a third direction which covers a third angular range of about 72° which is the same as the first angular range, as shown in FIG. 9C. Subsequently, the source station STA-X transmits a fourth mRTS message in a fourth direction which covers a fourth angular range of about 72° which is the same as the first angular range, as shown in FIG. 9D. Finally, the source station STA-X transmits a fifth mRTS message in a fifth direction which covers a fifth angular range of about 72° which is the same as the first angular range, as shown in FIG. 9E. In another embodiment, the angular range(s) covered by one or more of the mRTS messages can be different from each other.

While the source station STA-X transmits the mRTS messages, the source station STA-X is in a directional mode, and the destination station STA-Y is in a quasi-omni directional mode, as shown in FIG. 4B. Other details of the directional mode and the quasi-omni directional mode can be as described above in connection with FIGS. 3A and 3B.

In the illustrated embodiment, the first to fifth directions are arranged anticlockwise, and the angular ranges of adjacent directions slightly overlap with each other. However, the order of transmitting the first to fifth mRTS messages can be in the opposite direction, i.e., in the clockwise direction. In another embodiment, there can be substantially no overlap between angular ranges of adjacent directions. In yet another embodiment, there can be a gap between angular ranges of adjacent directions. A skilled technologist will also appreciate that the angular range of the source station can vary widely, depending on the configuration of the source station, and thus the number of mRTS messages can also vary, depending on the angular range of the source station.

In the illustrated embodiment, the source station STA-X sequentially transmits k-number of directional mRTS messages each in one direction. In another embodiment, the source station STA-X can transmit a quasi-omni directional RTS message such that the duration of the RTS message is long enough to span over the aSlotTime60 GHz duration.

Referring back to FIG. 7, at block 750, the source station determines if it has information on the position of the destination station, for example, from previous communication with the destination station. If "YES" at block 750, the source station orients its antenna system toward the destination station at block 760b. If "NO" at block 750, the source station changes its antenna system to quasi-omni directional mode. Other details of the quasi-omni directional mode can be as described above in connection with FIG. 3B.

Subsequently, at block 770, the source station may receive one or more of multiple clear-to-send (mCTS) messages from the destination station, as shown in the timing diagram of FIG. 5. Details of transmission and reception of the mCTS messages will be described later with reference to FIGS. 10 and 11A-11E. In addition, details of the frame format of the mCTS messages will be described later with reference to FIG. 12B.

Next, at block 780, upon receiving one or more of mCTS messages, the source station may wait for a SIFS period from the end of the mCTS period, as shown in the timing diagram of FIG. 5. Then, at block 790, the source station can send data to the destination station. The source and destination stations can use the optimum transmit and receive directions determined by a beamforming protocol. In case the source station does not receive any mCTS message from the destination station, the method goes back to block 710.

Figure 10:
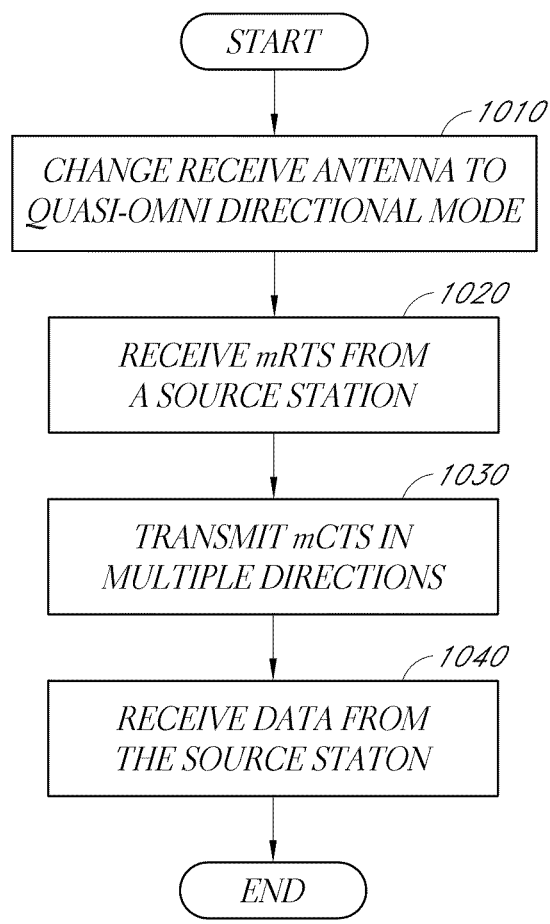
FIG. 10 is a flowchart illustrating a method of peer-to-peer wireless communication, performed by a destination station according to one embodiment.

Referring to FIG. 10, a method performed by the destination station in the embodiment of FIG. 7 will be described below. At block 1010, the destination station changes its antenna system to quasi-omni directional reception mode. Other details of the quasi-omni directional mode can be as described above in connection with FIG. 3B.

At block 1020, the destination station may receive one or more of mRTS messages from the source station, as shown in the timing diagram of FIG. 5. At block 1030, upon receiving the one or more mRTS messages, if the destination station is available for establishing a peer-to-peer connection with the source station, the destination station can transmit mCTS messages in multiple directions, as shown in the timing diagram of FIG. 5.

Referring now to FIG. 11A-11E, one example of a process occurring at block 1030 will be described below. In FIG. 11A, the destination station STA-Y transmits a first mCTS message in a first direction which covers a first angular range of about 360°/k, where k is the number of directions in which mCTS messages are transmitted. In the illustrated embodiment, the mCTS messages are transmitted in five directions, and thus, the first angular range is about 360°/5, or about 72°. In FIG. 11B, the destination station STA-Y transmits a second mCTS message in a second direction which covers a second angular range of about 72° which is the same as the first angular range. Because the source station STA-X is within the second angular range, the source station STA-X can receive the second mCTS.

Next, the destination station STA-Y transmits a third mCTS message in a third direction which covers a third angular range of about 72° which is the same as the first angular range, as shown in FIG. 11C. Subsequently, the destination station STA-Y transmits a fourth mCTS message in a fourth direction which covers a fourth angular range of about 72° which is the same as the first angular range, as shown in FIG. 11D. Finally, the destination station STA-Y transmits a fifth mCTS message in a fifth direction which covers a fifth angular range of about 72° which is the same as the first angular range, as shown in FIG. 11E. In another embodiment, the angular range(s) covered by one or more of the mCTS messages can be different from the other mCTS messages.

While the destination station STA-Y transmits the mCTS messages, the destination station STA-Y is in a directional mode, and the source station STA-X is in a quasi-omni directional mode, as shown in FIG. 4B. If the source station STA-X has information on the position of the destination station STA-Y, both the source and destination stations STA-X, STA-Y can be in a directional mode, as shown in FIG. 4A. Other details of the directional mode and the quasi-omni directional mode can be as described above in connection with FIGS. 3A and 3B.

In the illustrated embodiment, the first to fifth directions are arranged clockwise, and the angular ranges of adjacent directions slightly overlap with each other. However, the order of transmitting the first to fifth mCTS messages can be in the opposite direction, i.e., in the anticlockwise direction. In another embodiment, there can be substantially no overlap between angular ranges of adjacent directions. In yet another embodiment, there can be a gap between angular ranges of adjacent directions. A skilled technologist will also appreciate that the angular range of the destination station can vary widely, depending on the configuration of the destination station, and thus the number of mCTS messages can also vary, depending on the angular range of the destination station.

In the illustrated embodiment, the destination station STA-Y transmits each of k-number of directional mCTS messages in a respective one of different directions. In another embodiment, the destination station STA-Y can transmit a quasi-omni directional CTS in a selected direction such that the duration of the CTS is long enough to span over the aSlotTime60 GHz duration.

Referring back to FIG. 10, at block 1040, the destination station can receive data from the source station. Upon receiving the data, the destination station can send an acknowledgment to the source station, as shown in FIG. 5.

Frame Formats of mRTS and mCTS

Figure 12A:
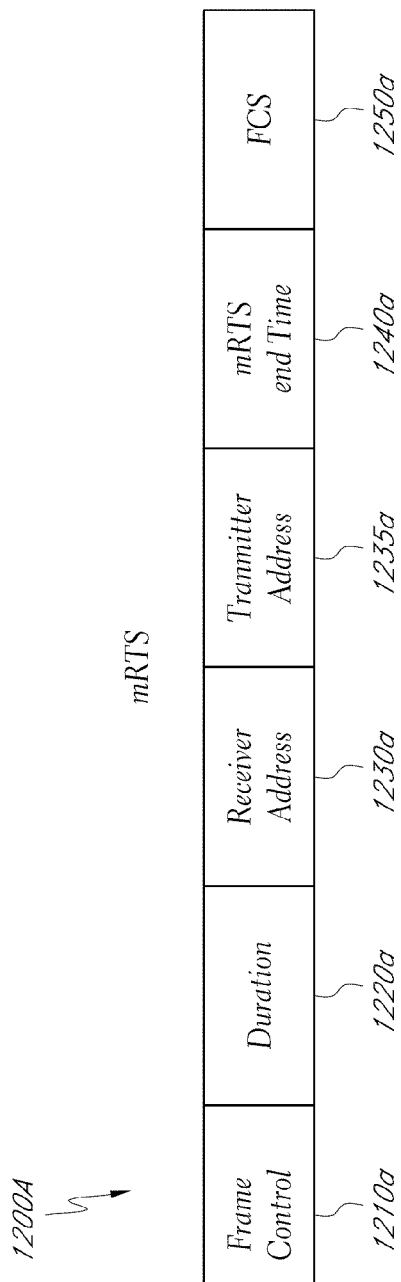
FIG. 12A is a frame format of an mRTS message used in the method of FIG. 5 according to one embodiment.

Referring to FIG. 12A, one embodiment of a frame format of an mRTS message will be described below. The illustrated mRTS frame format 1200A includes a frame control field 1210a, a duration field 1220a, a receiver address field 1230a, a transmitter address field 1235a, an mRTS end time field 1240a, and a frame check sequence (FCS) field 1250a.

The frame control field 1210a can contain information indicating that the frame 1200A is an mRTS frame. The frame control field 1210a can also include various subfields, such as Protocol Version, Type, Subtype, To DS, From DS, More Fragments, Retry, Power Management, More Data, Protected Frame, and Order. Other details of the frame control field 1210a can be as described in IEEE 802.11.

The duration field 1220a can indicate a period of time during which the wireless channel is to be reserved to transmit a data frame and a returning acknowledgment (ACK) frame. In one embodiment, the duration field 1220 can be 16 bits in length, and contain a value in microseconds. Other details of the duration field 1220a can be as described in IEEE 802.11.

The receiver address field 1230a can contain the address of a destination station that is the intended recipient of the mRTS message. The transmitter address field 1235a contains the address of the source station that transmits the mRTS frame 1200A. Other details of the receiver address field 1230a and the transmitter address field 1235a can be as described in IEEE 802.11.

The mRTS end time field 1240a can contain a value that indicates when the mRTS frame 1200A ends so that the destination station can decide when to transmit a next frame, for example, an mCTS frame, in the sequence. Thus, transmissions of mCTS frames by the destination station do not start before the specified mRTS end time.

The FCS field 1250a can contain a cyclic redundancy code (CRC) for correcting errors during transmission. The CRC can be a 32-bit CRC. The CRC can be calculated over all of the frame control field 1210a, the duration field 1220a, the receiver address field 1230a, the transmitter address field 1235a, and the mRTS end time period 1240a. Other details of the FCS field 1250a can be as described in IEEE 802.11.

Figure 12B:
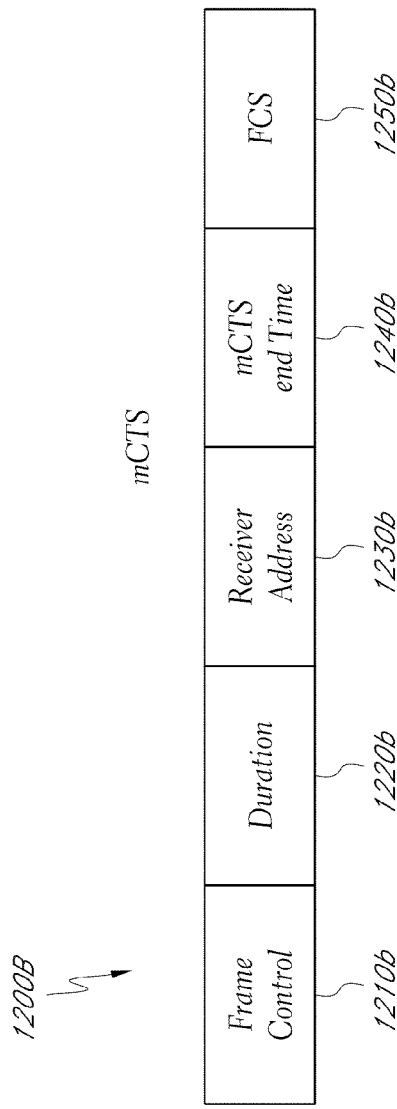
FIG. 12B is a frame format of an mCTS message used in the method of FIG. 5 according to one embodiment.

Referring to FIG. 12B, one embodiment of a frame format of an mCTS message will be described below. The illustrated mCTS frame format 1200B includes a frame control field 1210b, a duration field 1220b, a receiver address field 1230b, an mCTS end time field 1240b, and a frame check sequence (FCS) field 1250b.

The frame control field 1210b can contain information indicating that the frame 1200B is an mCTS frame. Other details of the frame control field 1210b can be as described above with respect to the frame control field 1210a of the mRTS frame 1200A of FIG. 12A.

The duration field 1220b can indicate a period of time during which the wireless channel is to be reserved to transmit a data frame and a returning acknowledgment (ACK) frame. Other details of the duration field 1220b can be as described above with respect to the duration field 1220a of the mRTS frame 1200A of FIG. 12A.

The receiver address field 1230b contains the address of the intended recipient of the mCTS message, that is, the source station. Other details of the receiver address field 1230b can be as described above with respect to the receiver address field 1230a of the mRTS frame 1200A of FIG. 12A.

The mCTS end time field 1240b can contain a value that indicates when the mCTS frame ends so that the source station can decide when to transmit a next frame, for example, a data frame, in the sequence. Thus, transmissions of data frames by the source station do not start before the specified mCTS end time.

The FCS field 1250b can contain a cyclic redundancy code (CRC) for correcting errors during transmission. Other details of the FCS field 1250b can be as described above with respect to the FCS field 1250a of the mRTS frame 1200A of FIG. 12A.

The frame formats of the mRTS and mCTS described above are modified versions of the frame formats of RTS and CTS set forth in IEEE 802.11. A skilled technologist will, however, appreciate that various other configurations of frame formats can also be used for mRTS or mCTS as long as they can provide required information for operation, for example, mRTS end time or mCTS end time.

The methods of the embodiments described above allow contention-based channel access for wireless devices having directional transmission/reception capability, for example, wireless devices using a frequency equal to or greater than 6 GHz, for example 60 GHz. Particularly, the methods can be used for establishing a peer-to-peer link. In addition, the method can be performed without use of a centralized coordinator, such as an access point. The method improves the reliability of directional data transmissions by facilitating multiple channel sensing opportunities in multiple directions. Further, the method can be backward compatible with the DCF mode of IEEE 802.11.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of communication in a wireless network comprising non-access point wireless devices, the method comprising:
    determining, by a non-access point wireless device having a directional antenna system in the wireless network, whether a wireless channel is available for establishing a peer-to-peer link by:
    sensing whether the channel is idle in a first direction during a first slot time period by orienting the directional antenna system toward the first direction, and
    sensing whether the channel is idle in a second direction different from the first direction during a second slot time period by orienting the directional antenna system toward the second direction;
    transmitting, by the wireless device, multiple requests in different directions for establishing a peer-to-peer link, wherein one or more of the multiple requests comprise a modified request-to-send (mRTS) format that includes end time information; and
    establishing the peer-to-peer link between the wireless devices by contention-based channel access, wherein the wireless devices are free to contend any time for accessing a wireless channel.

2. The method of claim 1, wherein the wireless channel has a frequency equal to or greater than 6 GHz.

3. The method of claim 1, wherein determining whether the wireless channel is available comprises repeatedly sensing whether the channel is idle in a plurality of different directions during further other slot time periods by orienting the directional antenna toward the different directions until the wireless channel has been sensed in substantially all directions.

4. The method of claim 3, wherein the directional antenna system is configured to cover different angular ranges for two or more of the different directions.

5. The method of claim 3, wherein the directional antenna system covers an angular range of about 360°/k in each of the different directions, and wherein determining whether the wireless channel is available comprises repeatedly sensing whether the channel is idle in each of k-number of different directions during a respective one of k-number of slot time periods.

6. The method of claim 5, wherein determining whether the wireless channel is available comprises determining whether the wireless channel is available during at least part of Distributed Coordination Function (DCF) Interframe Space (DIFS).

7. The method of claim 6, wherein each of the k-number of slot time periods has a duration the same as the duration of one aSlotTime.

8. The method of claim 7, wherein each of the k-number of slot time periods includes, in sequence, aCCATime, aRxTxTurnaroundTime, aAirPropagationTime, and aMACProcessingDelay.

9. The method of claim 8, wherein determining whether the wireless channel is available comprises:
    waiting for a short interframe space (SIFS) period after the end of the k-number of slot time periods; and
    waiting for one aSlotTime after the end of the SIFS period.

10. The method of claim 6, further comprising:
    if the channel is sensed to be idle until the end of the DIFS, a source wireless station transmits multiple modified request-to-send (mRTS) messages to a destination wireless device;
    upon receiving one or more mRTS messages, the destination wireless device waits for a short interframe space (SIFS) duration; and
    upon the source wireless station being available for a peer-to-peer connection with the source station, the destination station transmits multiple modified clear-to-send (mCTS) messages to the source station.

11. The method of claim 5, further comprising:
    transmitting, by the other wireless device having a directional antenna system comprising an array of antenna elements, one or more reply messages for establishing the link, using the directional antenna system.

12. The method of claim 11, wherein transmitting the one or more reply messages comprises transmitting a reply message in a selected direction, using less than all of the antenna elements of the directional antenna system of the other wireless device.

13. The method of claim 12, wherein transmitting the reply message comprises transmitting a single reply message for a duration the same as a total duration of the k-number of slot time periods.

14. The method of claim 11, wherein each reply message comprises a modified clear-to-send (mCTS) format including mCTS end time information.

15. The method of claim 14, wherein the mCTS end time information is used by a source wireless station for determining when to transmit a next frame.

16. The method of claim 1, wherein sensing whether the channel is idle during the first slot time period comprises:
    accessing the channel during a first sub-period in the first direction to detect whether the channel is busy or idle;
    changing a physical layer of the wireless device from a first mode for receiving a symbol of a frame on the channel to a second mode for transmitting a symbol on the channel during a second sub-period;
    waiting for a third sub-period for a signal to travel on the channel from the wireless device to another wireless device in the wireless network; and
    processing a received frame at a medium access control (MAC) layer of the wireless device during a fourth sub-period.

17. The method of claim 1, further comprising:
    transmitting, by the wireless device, multiple requests for establishing a link with another non-access point wireless device in the wireless network, the requests being addressed to the other wireless device, by: transmitting a first request in a first request transmission direction by orienting the directional antenna system toward the first request transmission direction, and
    transmitting a second request in a second request transmission direction by orienting the directional antenna system toward the second request transmission direction.

18. The method of claim 17, wherein transmitting the multiple requests comprises repeatedly transmitting another request in a different direction by orienting the directional antenna toward the different direction until the requests have been transmitted in substantially all directions.

19. The method of claim 18, wherein the directional antenna system is configured to cover an angular range of about 360°/k in each of the first and second request transmission directions, and wherein transmitting the multiple requests comprises transmitting k-number of requests each in respective different directions.

20. The method of claim 17, wherein the antenna system comprises an array of antenna elements, and wherein the method further comprises receiving, by the wireless device, a reply message by using less than all of the antenna elements in the array of antenna elements.

21. The method of claim 20, further comprising:
waiting for a short interframe space (SIFS) period from the end of reply message; and
transmitting data to the second wireless device after waiting for the SIFS period.

22. The method of claim 17, further comprising receiving, by the wireless device, a reply message by orienting the directional antenna system toward a selected direction.

23. The method of claim 1, wherein the mRTS format comprises a field indicative of the mRTS end time.

24. The method of claim 23, wherein the mRTS format comprises a frame control field, a duration field, a receiver address field, a transmitter address field, an mRTS end time field, and a frame check sequence field.

25. The method of claim 1, wherein the end time information comprises mRTS end time information.

26. A method of communication in a wireless network comprising non-access point wireless devices, the method comprising:
receiving, by a non-access point wireless device in the wireless network, a request addressed to the wireless device for establishing a link with another non-access point wireless device in the wireless network, wherein the wireless device comprises a directional antenna system including an array of antenna elements; and
transmitting, by the wireless device, multiple replies for establishing the link, wherein one or more of the replies comprise a modified clear-to-send (mCTS) format that includes end time information, the replies being addressed to the other wireless device, by:
transmitting a first reply in a first reply transmission direction by orienting the directional antenna system toward the first reply transmission direction, and
transmitting a second reply in a second reply transmission direction by orienting the directional antenna system toward the second reply transmission direction; and
establishing a peer-to-peer link between the wireless devices by contention-based channel access, wherein the wireless devices are free to contend any time for accessing a wireless channel.

27. The method of claim 26, wherein receiving the request comprises using less than all of the antenna elements.

28. The method of claim 26, wherein transmitting the multiple replies comprises: repeatedly transmitting another reply in a different direction by orienting the directional antenna toward the different direction until the replies have been transmitted in substantially all directions.

29. The method of claim 28, wherein the directional antenna system is configured to cover an angular range of about 360°/k in each of the first and second reply transmission directions, and wherein transmitting the multiple replies comprises
transmitting k-number of replies each in respective different directions.

30. A method of communication in a wireless network comprising non-access point wireless devices, the method comprising:
determining, by a first non-access point wireless device having a directional antenna system in the wireless network, whether a wireless channel is available for establishing a peer-to-peer link, wherein determining whether the wireless channel is available comprises repeatedly sensing whether the channel is idle in each of different directions during a respective one of different slot time periods;
sequentially transmitting, by the first wireless device, multiple requests each in respective different directions for establishing a link with a second non-access point wireless device in the wireless network, the requests being addressed to the second wireless device, wherein one or more of the multiple requests comprise a modified request-to-send (mRTS) format that includes end time information;
sequentially transmitting, by the second wireless device, multiple replies each in respective different directions for establishing the link with the first wireless device, the replies being addressed to the first wireless device; and
establishing a peer-to-peer link between the wireless devices by contention-based channel access, wherein the wireless devices are free to contend any time for accessing a wireless channel.

31. The method of claim 30, wherein determining whether the wireless channel is available comprises repeatedly sensing whether the channel is idle in a plurality of different directions until the wireless channel has been sensed in substantially all directions;
wherein transmitting the multiple requests comprises repeatedly transmitting requests in respective different directions until the requests have been transmitted in substantially all directions; and
wherein transmitting the multiple replies comprises repeatedly transmitting replies in respective different directions until the replies have been transmitted in substantially all directions.

32. The method of claim 30, wherein the mRTS comprises a message field indicative of the end time of completing transmission of multiple mRTS messages, and wherein transmitting the multiple replies comprises transmitting the first one of the multiple replies after the end time.

33. The method of claim 30, wherein one or more of the multiple replies comprise a modified clear-to-send (mCTS) message field indicative of the end time of completing transmission of the multiple replies, and wherein the method further comprises transmitting data from the first wireless device to the second wireless device after the end time.

34. A non-access point wireless device for wireless communication in a wireless network including a plurality of non-access point wireless devices, the device comprising:
a directional antenna system; and
a medium access control (MAC) layer that establishes a peer-to-peer link between the wireless device and one non-access point wireless device of the plurality of non-access point wireless devices by contention-based channel access, wherein the wireless device is free to contend any time for accessing a wireless channel, wherein the MAC layer determines whether the wireless channel is available for establishing a peer-to-peer link, wherein the directional antenna system:
senses whether the channel is idle in a first direction during a first slot time period by orienting the directional antenna system toward the first direction, senses whether the channel is idle in a second direction different from the first direction during a second slot time period by orienting the directional antenna system toward the second direction, transmits, by the wireless device, multiple requests in different directions for establishing a peer-to-peer link, wherein one or more of the multiple requests comprise a modified request-to-send (mRTS) format that includes end time information, and establishesthe peer-to-peer link.

35. The device of claim 34, wherein the wireless channel has a frequency equal to or greater than 6 GHz.

36. The device of claim 34, wherein the MAC layer is configured to repeatedly sense whether the channel is idle in a plurality of different directions during further other slot time periods by orienting the directional antenna toward the different directions until the wireless channel has been sensed in substantially all directions.

37. The device of claim 36, wherein the directional antenna system covers different angular ranges for two or more of the different directions.

38. The device of claim 36, wherein the directional antenna system covers an angular range of 360°/k in each of the different directions, and wherein the MAC layer is configured to repeatedly sense whether the channel is idle in each of k-number of different directions during a respective one of k-number of slot time periods.

39. The device of claim 38, wherein the MAC layer determines whether the wireless channel is available during at least part of Distributed Coordination Function (DCF) Interframe Space (DIFS).

40. The device of claim 39, wherein each of the k-number of slot time periods has a duration the same as the duration of one aSlotTime, and wherein each of the k-number of slot time periods includes, in sequence, aCCATime, aRxTxTurnaroundTime, aAirPropagationTime, and aMACProcessingDelay.

41. The device of claim 40, wherein the MAC layer waits for a short interframe space (SIFS) period after the end of the k-number of slot time periods, and wherein the MAC layer waits for one aSlotTime after the end of the SIFS period.

42. The device of claim 34, wherein the MAC layer:
accesses the channel during a first sub-period in the first direction to detect whether the channel is busy or idle;
changes a physical layer of the wireless device from a first mode for receiving a symbol of a frame on the channel to a second mode for transmitting a symbol on the channel during a second sub-period;
waits for a third sub-period for a signal to travel on the channel from the wireless device to another wireless device in the wireless network; and
processes a received frame during a fourth sub-period.

43. The device of claim 34, wherein the MAC layer transmits multiple requests for establishing a link with another non-access point wireless device in the wireless network, the requests being addressed to the other wireless device, wherein the device:
transmits a first request in a first request transmission direction by orienting the directional antenna system toward the first request transmission direction, and
transmits a second request in a second request transmission direction by orienting the directional antenna system toward the second request transmission direction.

44. The device of claim 43, wherein the MAC layer repeatedly transmits another request in a different direction by orienting the directional antenna toward the different direction until the requests have been transmitted in substantially all directions.

45. The device of claim 44, wherein the directional antenna system covers an angular range of about 360°/k in each of the first and second request transmission directions, and wherein the MAC layer transmits k-number of requests each in respective different directions.

46. The device of claim 43, wherein the antenna system comprises an array of antenna elements, and wherein the MAC layer receives a reply message after transmitting the multiple requests, by using less than all of the antenna elements.

47. The device of claim 46, wherein the MAC layer waits for a short interframe space (SIFS) period from the end of reply message; and transmits data to the second wireless device.

48. The device of claim 43, wherein the MAC layer receives a reply message by orienting the directional antenna system toward a selected direction after transmitting the multiple requests.

49. The device of claim 34, wherein the mRTS format comprises a field indicative of the end time information.

50. The device of claim 49, wherein the mRTS format comprises one or more of a frame control field, a duration field, a receiver address field, a transmitter address field, an mRTS end time field, and a frame check sequence field.

51. A non-access point wireless device for wireless communication in a wireless network including a plurality of non-access point wireless devices, the device comprising:
a directional antenna system including an array of antenna elements; and
a medium access control (MAC) layer that establishes a peer-to-peer link between the wireless device and one non-access point wireless device of the plurality of non-access point wireless devices by contention-based channel access, wherein the wireless device is free to contend any time for accessing a wireless channel,
wherein the MAC layer receives a request addressed to the wireless device for establishing a link with another non-access point wireless device, by using less than all of the antenna elements;
wherein the MAC layer transmits multiple replies for establishing the link, wherein one or more of the replies comprise a modified clear-to-send (mCTS) format that includes end time information, the replies being addressed to the other wireless device, wherein the device:
transmits a first reply in a first reply transmission direction by orienting the directional antenna system toward the first reply transmission direction, and
transmits a second reply in a second reply transmission direction by orienting the directional antenna system toward the second reply transmission direction.

52. The device of claim 51, wherein the MAC layer repeatedly transmits another reply in a different direction by orienting the directional antenna toward the different direction until the replies have been transmitted in substantially all directions.

53. The device of claim 52, wherein the directional antenna system covers an angular range of about 360°/k in each of the first and second reply transmission directions, and wherein the MAC layer transmits k-number of replies each in respective different directions.

54. A wireless system comprising non-access point wireless devices, the system comprising:
- a first non-access point wireless device in the wireless network, the first wireless device having a directional antenna system; and
- a second non-access point wireless device in the wireless network, the second wireless device having a directional antenna system,
- wherein the first wireless device determines whether a wireless channel is available for establishing a peer-to-peer link, by repeatedly sensing whether the channel is idle in each of different directions during a respective one of different slot time periods;
- wherein the first wireless device sequentially transmits multiple requests each in respective different directions for establishing a link with the second wireless device, the requests being addressed to the second wireless device, wherein one or more of the requests comprise a modified request-to-send (mRTS) format that includes end time information; and
- wherein the second wireless device sequentially transmits multiple replies each in respective different directions for establishing the link, the replies being addressed to the first wireless device, wherein the replies include reply end time information,
- wherein the first wireless device and the second wireless device establish a peer-to-peer link by contention-based channel access, wherein each of the wireless devices in the wireless system are free to contend any time for accessing a wireless channel.

55. The system of claim 54, wherein the first wireless device repeatedly senses whether the channel is idle in a plurality of different directions until the wireless channel has been sensed in substantially all directions;
- wherein the first wireless device repeatedly transmits requests in respective different directions until the requests have been transmitted in substantially all directions; and
- wherein the second wireless device repeatedly transmits replies in respective different directions until the replies have been transmitted in substantially all directions.

56. The system of claim 54, wherein the request end time information is used by the second wireless device for determining when to transmit a next frame to the first wireless device.

* * * * *